(12) United States Patent
Schulze et al.

(10) Patent No.: US 7,255,334 B2
(45) Date of Patent: Aug. 14, 2007

(54) AIR SUSPENSION PISTON

(75) Inventors: Thorsten Schulze, Wunstorf (DE);
Franz Steimmel, Rheinbreitbach (DE);
Michael Opitz, Aerzen (DE); Frank Wahner, Hannover (DE)

(73) Assignee: VAW Alutubes GmbH, Hannover (DE)

( * ) Notice: Subject to any disclaimer, the term of this patent is extended or adjusted under 35 U.S.C. 154(b) by 276 days.

(21) Appl. No.: 10/329,825

(22) Filed: Dec. 24, 2002

(65) Prior Publication Data

US 2003/0127782 A1    Jul. 10, 2003

Related U.S. Application Data

(63) Continuation of application No. 09/833,035, filed on Apr. 11, 2001, now abandoned.

(30) Foreign Application Priority Data

Apr. 12, 2000    (DE) .............................. 100 18 238

(51) Int. Cl.
*F16F 5/00*    (2006.01)
(52) U.S. Cl. .................... 267/64.11; 148/688
(58) Field of Classification Search .. 267/64.11–64.19, 267/64.21–64.28; 148/688–698
See application file for complete search history.

(56) References Cited

U.S. PATENT DOCUMENTS

| 2,796,508 | A | * | 6/1957 | Holman et al. ................ 219/61 |
| 3,552,629 | A | | 1/1971 | Armbruster et al. ........... 228/1 |
| 4,000,007 | A | | 12/1976 | Develay et al. ................ 148/2 |
| 4,082,578 | A | | 4/1978 | Evancho et al. ......... 148/12.7 A |
| 4,324,596 | A | | 4/1982 | Wuebker ................ 148/11.5 A |
| 4,527,978 | A | | 7/1985 | Zackrisson ................. 464/183 |
| 4,665,294 | A | | 5/1987 | Hira et al. ............ 219/121 LD |
| 5,324,133 | A | | 6/1994 | Kreis et al. ................. 403/270 |
| 5,337,997 | A | | 8/1994 | Hockney .................... 248/596 |
| 5,342,139 | A | | 8/1994 | Hoffman .................. 403/405.1 |
| 5,350,044 | A | | 9/1994 | Gelhausen ............. 188/322.12 |
| 5,432,139 | A | * | 7/1995 | Shamshoum et al. ....... 502/125 |
| 5,547,524 | A | | 8/1996 | Sainfort et al. ............. 148/688 |
| 5,568,742 | A | | 10/1996 | Bauer ............................ 72/61 |
| 5,638,927 | A | | 6/1997 | Cheatham et al. ..... 188/322.19 |
| 5,766,546 | A | | 6/1998 | Schwellinger .............. 420/544 |
| 5,785,776 | A | | 7/1998 | Sircar ......................... 148/689 |
| 5,848,676 | A | | 12/1998 | Deigner ................. 188/321.11 |
| 5,857,916 | A | | 1/1999 | Schoch et al. ............. 464/183 |
| 5,874,708 | A | | 2/1999 | Kinsman et al. ........ 219/121.64 |
| 5,893,436 | A | | 4/1999 | Guy ...................... 188/322.15 |
| 6,024,343 | A | * | 2/2000 | Ebert ...................... 267/64.27 |
| 6,113,081 | A | * | 9/2000 | Hilburger et al. ........ 267/64.27 |
| 6,113,850 | A | | 9/2000 | Bartges et al. ............. 420/530 |
| 6,168,067 | B1 | | 1/2001 | Waldron et al. .......... 228/112.1 |
| 6,248,189 | B1 | | 6/2001 | Shaffer et al. .............. 148/417 |
| 6,350,044 | B1 | | 2/2002 | Lea ............................ 362/298 |
| 6,361,028 | B1 | | 3/2002 | Hubbell ................... 267/64.27 |

FOREIGN PATENT DOCUMENTS

| DE | 41 42 325 A1 | 6/1993 |
| EP | 0 548 859 | 6/1993 |
| EP | 0 679 815 | 11/1995 |

* cited by examiner

*Primary Examiner*—Devon Kramer
(74) *Attorney, Agent, or Firm*—Proskauer Rose LLP

(57) ABSTRACT

The invention relates to an air suspension piston, with the air suspension piston being tube shaped and being made of aluminium. The air suspension piston is formed by a longitudinal-seam welded tube made from an aluminum alloy, and the tube has been longitudinal-seam welded without any weld metal.

6 Claims, 1 Drawing Sheet

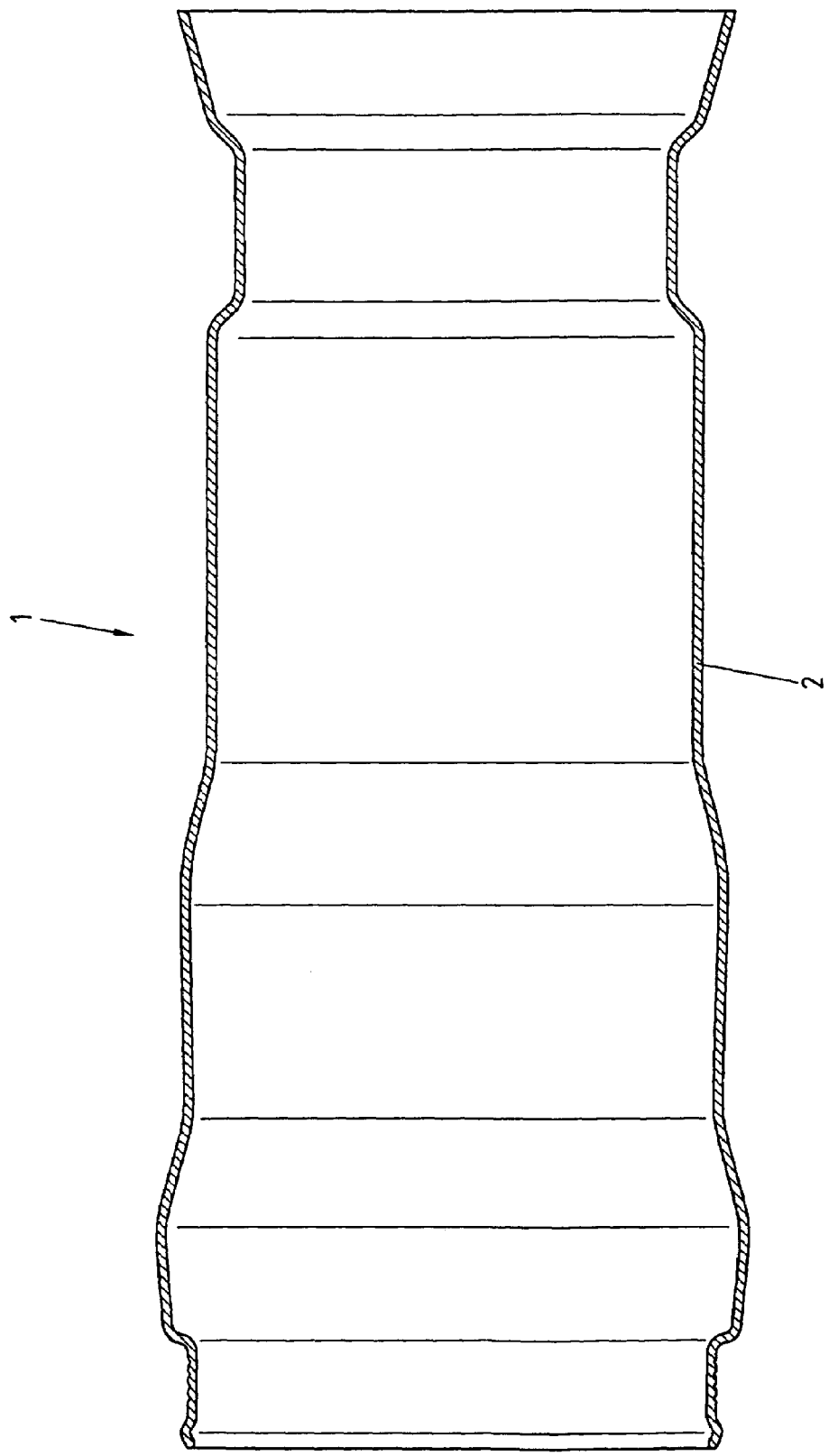

AIR SUSPENSION PISTON

CROSS REFERENCE TO RELATED APPLICATIONS

This application is a continuation of U.S. patent application Ser. No. 09/833,035, filed Apr. 11, 2001, now abandoned, which is hereby incorporated herein in its entirety, which claims the benefit of copending German Application No. 10018238.0-12, filed Apr. 12, 2000.

BACKGROUND OF THE INVENTION

This invention relates to an air suspension piston that is constructed in the shape of a tube and is made of aluminum.

Air suspension systems are particularly used in the automotive engineering sector, e.g., in the case of automobiles or truck cabins. The characteristic feature of air suspension systems consists of an air cushion element in which air subjected to pressure is being used for cushioning.

The piston is an important component of an air suspension system. An air bellow, made of rubber, rolls on the outer surface of the piston when the air suspension system is in action and when a cushioning process takes place. The piston positions or supports the air bellow so that there are no folds. Furthermore, the geometry of the piston, namely the selection of various diameters of the piston, has an influence on the spring characteristics of the air suspension system.

During assembly of an air cushion system, the air suspension piston is fitted into the system components and for this reason the air suspension piston has to be engineered to high precision with minimum tolerances. High precision is also required by the fact that the air suspension piston is continuously exposed to pressure variations as a result of the action of the suspension system, with additional axial forces which act in a dynamic way being superimposed on the pressure variations.

Usually tubes are used as air suspension pistons; with these tubes being either made of steel or aluminium.

Insofar as steel tubes are used, they are longitudinal-seam welded and drawn. While such steel tubes meet the requirements of air suspension pistons, in particular concerning their dynamic characteristics, they are however associated with the disadvantage that steel tubes are relatively heavy.

An effort is therefore made to use aluminium tubes since they are considerably lighter, typically saving approximately 30% weight compared to steel tubes. In automotive engineering there is a general trend toward saving weight in the case of dynamically loaded components, because then all the other components whose design is influenced by the vehicle mass, can be of lighter construction. Thus, there is an endeavor to use aluminium, in particular if at the same time this leads to a reduction in the unsprung masses, of which the air suspension piston is a part, and which are so important for driving comfort.

Known aluminium air suspension pistons are made from extruded semifinished products. Due to the general precision requirements of air suspension pistons for the reasons explained above, the known aluminium tubes have to be drawn. For air suspension pistons, stringent manufacturing tolerances are of prime importance due to sealing against air loss, hence the above-mentioned requirements for precision which relate to both the exterior diameter and the interior diameter as well as the wall thickness of the aluminium tube. Due to the tolerances in the range of a few hundredths of mm applying to the fitted components, conditional on sealing problems as well as acoustic problems in the case of non pressed-on air suspension pistons, exacting requirements apply to the used semifinished products.

Furthermore, the exterior surface must be very smooth, so as to prevent excessive wear of the air bellows which are continuously rolling off this surface.

Moreover, for reasons of further weight saving, there is also the demand for minimum wall thickness of the tube of an air suspension piston. However, production of respective extruded aluminium tubes of such minimal wall thickness is only possible using a subsequent tube drawing process which is associated with considerable production effort and expense.

Thus the desired use of aluminium in the production of air suspension pistons is still associated with severe disadvantages and due to the above-mentioned requirements with regard to precision, wall thickness and minimum tolerances, the known extruded and drawn aluminium tubes require a great deal of production effort and expense.

Apart from extruded aluminium tubes, longitudinal seam welded tubes made of aluminium alloys are known per se. The German published application DE 41 42 325 A1 describes a method for producing chassis members for vehicles, in particular for automobiles, said chassis members being made of aluminium alloys. This published application is based on the fact that in those cases where the conventional extruded aluminium tubes are being processed to become chassis components of motor vehicles, many forming steps are required, including fluid forming or internal high-pressure forming.

As is described in the above mentioned published application DE 41 42 325 A1, the known extruded aluminium tubes are associated with the disadvantage that fluid forming after previous other forming is not possible because the forming capacity of the material has been exhausted by previous forming. Nor is it possible to carry out intermediate annealing prior to the fluid forming because the material either hardens at low annealing temperatures or becomes very soft at higher annealing temperatures, thus losing its strength. There is no possibility of regaining any of this strength by further heat treatment.

Against the background of nevertheless finding a starting material for the production of chassis members made of aluminium alloys, with which materials the necessary forming steps can be carried out without any problems, the above mentioned published application DE 41 42 325 A1 proposes a method which uses longitudinal-seam welded tubes from a self-hardened or hardenable aluminium alloy as blanks.

SUMMARY OF THE INVENTION

By contrast, the present invention does not deal with the problems of making possible a multitude of forming steps and of providing for intermediate annealing prior to the fluid forming.

It is the object of the invention to create an air suspension piston made of aluminium, which in spite of the required precision and close tolerances due to the dynamic characteristics, can be produced economically and cost-effectively, so that the aluminium which per se is an advantageous material, can also be used for the production of air suspension pistons.

BRIEF DESCRIPTION OF THE DRAWING

FIG. 1 is a partial sectional view of an air suspension piston according to the invention.

DETAILED DESCRIPTION OF THE INVENTION

In an air suspension piston constructed in the shape of a tube and made of aluminum, the aforementioned object is achieved in an air suspension piston that is a longitudinal-seam welded tube made from an aluminum alloy.

While up to now, longitudinal seam welded steel tubes were used for producing air suspension pistons, the invention provides for the air suspension pistons to be made from a longitudinal-seam welded tube made of an aluminium alloy.

Constructing the air suspension piston in the form of a longitudinal-seam welded aluminium tube is of particular advantage. Apart from achieving weight savings compared to steel tubes, the precision and close tolerances which can be achieved with longitudinal-seam welded aluminium tubes are significant. Such air suspension pistons made of aluminium can be produced more economically and cost-effectively than conventional air suspension pistons.

According to a first development of the invention, the tube is longitudinal-seam welded without any weld metals.

In a suitable embodiment of the invention, the aluminium alloy consists of a self-hardened alloy.

The step according to the invention, of constructing the air suspension pistons as longitudinal-seam welded tubes from a self-hardened aluminium alloy, must be considered a surprising measure as the average person skilled in the art knows that higher-strength self-hardened aluminium alloys tend to corrode at temperatures above approximately 60° C. Yet air suspension pistons are quite commonly exposed to such temperatures. During operation said temperatures result from heat radiation from the engine, from the gearbox, the exhaust manifold and from the brakes.

The corrosion mentioned is associated with the disadvantage that it can have a significant negative effect on the fatigue strength of the material, which for safety reasons is not permissible in the case of air suspension pistons. Trials show however that the longitudinal-seam welded aluminium tubes according to the invention are not associated with the danger of reduced fatigue strength. Thus, the measures according to the invention surprisingly led to the experts overcoming a prejudice.

Furthermore, up to now, the average person skilled of the art had considerable misgivings from the point of view of weld seam safety in the case of longitudinal-seam welded aluminium tubes being used where they are exposed to the dynamic loads experienced in air suspension pistons. Weld seam safety is a significant factor in view of the mechanical strength required in the case of components subjected to considerable dynamic loads. For this reason, the state of the art preferably restricted the use of longitudinal seam welded aluminium tubes to components subjected to static loads. While aluminium tubes have been used in the case of components subjected to dynamic loads, those were always extruded aluminium tubes rather than longitudinal-seam welded aluminium tubes.

In the invention it is advantageous in view of the air suspension pistons, that longitudinal-seam welded tubes welded without weld metal are considerably more precise in relation to wall thickness, and involve considerably smaller tolerances than is the case with extruded tubes. Variations in weight along their length are significantly smaller in the case of longitudinal-seam welded tubes when compared to extruded tubes made of aluminium. This has an advantageous effect on the dynamic characteristics.

According to a suitable embodiment of the invention, the weld seam of the tube is raised between −0.1 and +0.1 mm. For production of the air suspension piston according to the invention, high-frequency induction welding (HFI welding) can be used in the known way, with no weld metal being required for the welding process. Nevertheless, a weld seam forms which represents an increase in the wall thickness of the aluminium tube.

This increase in thickness, referred to as a raised seam, is subsequently removed in the stated tolerance band of −0.1 to +0.1 mm, i.e., in the region of the weld seam, an increased thickness of +0.1 mm is still permissible, on the other hand it is still permissible if during removal of the raised seam too much material is removed, resulting in a reduction in the wall thickness of the tube of 0.1 mm.

Further suitable embodiments of the invention may include an air suspension piston constructed in the shape of a tube, longitudinal-seam welded, and made of an aluminum alloy. The tube may have one or more of the following features. The tube may be longitudinal-seam welded without any weld metal. The tube may be made of a self-hardened aluminum alloy. The tube may have a wall thickness of 1.5 mm. The longitudinal-seam welded tube may be formed to the geometry of an air suspension piston by one of the following processes: drawing-in and enlargement operations; hot forming operations; hot forming operations using internal high-pressure. The weld seam of the tube may be raised between −0.1 mm and +0.1 mm.

FIG. 1 shows an improved air suspension piston 1 constructed in the shape of a tube. Air suspension tube 1 may include longitudinal-seam welded tube 2 made of an aluminum alloy. Longitudinal-seam welded tube 2 may include a self-hardened aluminum alloy.

Furthermore, according to another embodiment of the present invention, longitudinal-seam welded tube 2 may be welded without any weld metal. The wall thickness of another preferable embodiment may have a wall thickness of 1.5 mm.

As shown in FIG. 1, a suspension piston according to the present invention may have sections with different diameters which may be formed by one of the following processes: drawing-in and enlargement operations, hot forming operations, and hot forming operations using internal high-pressure.

Additionally, the weld seam, not depicted in FIG. 1, of longitudinal-seam welded tube 2 may be raised between −0.1 mm and +0.1 mm.

What is claimed is:

1. An air suspension piston comprising a longitudinal-seam welded tube welded without any weld metal and made from an aluminum alloy, wherein the aluminum alloy is a self-hardened alloy.

2. The air suspension piston of claim 1, wherein the wall thickness of the tube is 1.5 mm.

3. The air suspension piston of claim 1, wherein the longitudinal-seam welded tube has been formed to the geometry of the air suspension piston by a drawing-in and enlargement operation.

4. The air suspension piston of claim 1, wherein the longitudinal-seam welded tube has been formed to the geometry of the air suspension system by hot forming operations.

5. The air suspension piston of claim 1, wherein the longitudinal-seam welded tube has been formed to the geometry of the air suspension system by hot forming operations using internal high-pressure.

6. The air suspension piston of claim 1, wherein the weld seam of the tube is raised between −0.1 mm and +0.1 mm.

* * * * *